Feb. 1, 1944.   E. A. RYDER   2,340,566
METHOD OF INSTALLING VALVE PORT LINERS
Filed Oct. 8, 1941
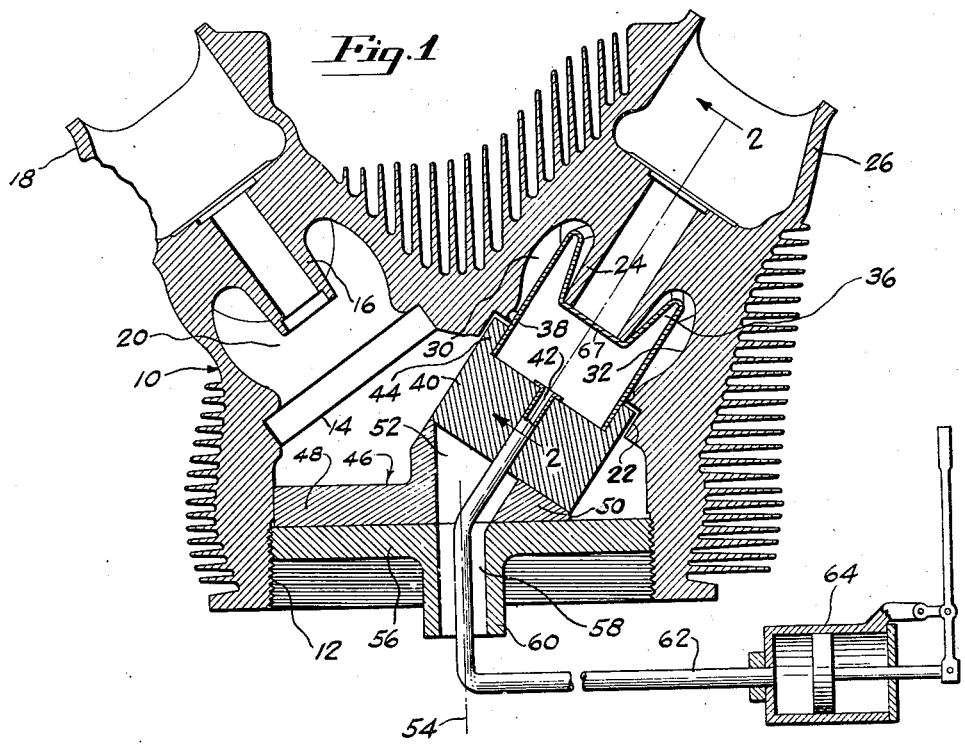
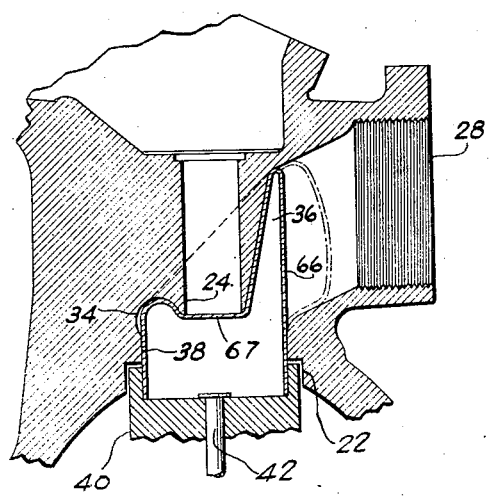
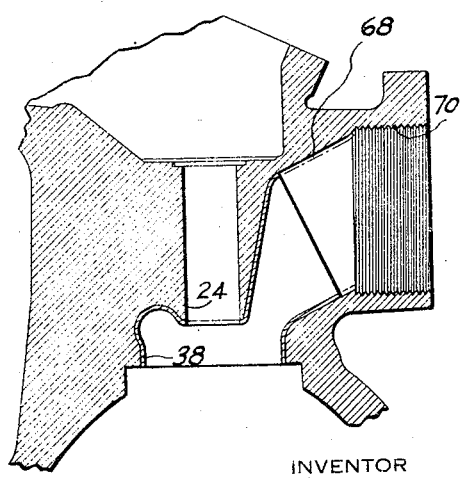
INVENTOR
Earle A. Ryder
BY Harris G. Luther
ATTORNEY Patented Feb. 1, 1944

2,340,566

UNITED STATES PATENT OFFICE 2,340,566

METHOD OF INSTALLING VALVE PORT LINERS

Earle A. Ryder, West Hartford, Conn., assignor to United Aircraft Corporation, East Hartford, Conn., a corporation of Delaware Application October 8, 1941, Serial No. 414,163

5 Claims. (Cl. 29—156.4)

This invention relates to an improved method for installing metallic liners in channels of irregular shape and has particular reference to an improved method for installing a metal liner in a cylinder valve port in a cylinder head preformed by forging operations.

An object of the invention resides in the provision of an improved method for expanding a corrosion resisting liner into a cylinder valve port in a preformed cylinder head in such a manner that the liner will be firmly locked in position in the valve port after the expansion process has been completed.

A further object resides in the provision of an improved method for quickly and easily installing resistant linings in preformed fluid passages of irregular shape such as engine cylinder valve ports.

Other objects and advantages will be more particularly pointed out hereinafter or will become apparent as the description proceeds.

In the accompanying drawing, in which like reference numerals are used to designate similar parts throughout, there is illustrated a suitable mechanical embodiment for the purpose of disclosing the invention. The drawing, however, is for the purpose of illustration only and is not to be taken as limiting or restricting the invention since it will be apparent to those skilled in the art that various changes in the illustrated apparatus and in the method hereinafter described may be resorted to without in any way exceeding the scope of the invention.

In the accompanying drawing, Fig. 1 is a cross-sectional view of an engine cylinder head and apparatus constructed according to the invention for applying a liner to a valve port in the cylinder head.

Fig. 2 is a sectional view of a fragmentary portion of the cylinder head shown in Fig. 1 taken on the line 2—2 of Fig. 1 showing a valve port liner in an intermediate stage of installation inserted in a valve port in the cylinder head, and Fig. 3 is a cross-sectional view similar to Fig. 2 showing the finished liner in place in the valve port.

In certain types of modern internal-combustion engines, particularly in air-cooled aircraft engines having aluminum cylinder heads and utilizing high compression ratios and fuel containing a large amount of detonation suppressing materials, it has been found desirable to provide valve ports in the cylinder heads of such engines, and particularly the exhaust valve ports, with liners of non-corrosive heat resisting material, such as stainless steel. Where such cylinder heads are cast it is fairly easy to install such a liner as the liner can be made up and positioned in the mold and the molten metal caused to flow around it. This practice is not possible, however, when the cylinder head is forged from a blank or ingot and the valve ports are provided therein by machining operations. Because of the extremely irregular shape and the curvature of the exhaust gas passage through a cylinder head of the character indicated it has been found extremely difficult to install such liners in the exhaust gas passage and to securely anchor them in position in the passage in a manner in which they will effectively protect the passage walls against corrosion from the high temperature exhaust gases passing therethrough. It is among the objects of this invention to provide an improved method for quickly and easily installing such liners in the cylinder head exhaust gas passages and at the same time for anchoring the liners securely in position to protect the passage walls.

Referring to the drawing in detail, the numeral 10 generally indicates an engine cylinder head adapted to be secured to the end of a cylinder barrel by the internal threads 12. The cylinder head illustrated has provision for one intake valve and one exhaust valve. The intake valve is adapted to cooperate with a valve seat 14 and the stem thereof extends through a valve guide 16 into a rocker box 18 formed integral with the cylinder head and constructed to contain and support a portion of the valve actuating mechanism. An intake passage 20 leads from the exterior of the cylinder head to the space between the valve guide 16 and the valve seat 14 through which the explosive mixture is introduced to the engine cylinder when the intake valve is opened. The cylinder head is also provided with a countersunk well 22 for an exhaust valve seat insert and with an exhaust valve guide boss 24 and exhaust valve rocker box 26 also formed integral with the cylinder head.

As is particularly shown in Figs. 2 and 3, the exit end 28 of the exhaust passage is substantially perpendicular to the countersink 22 and the valve guide 24 projects into the passage between its two ends. Also the portion of the passage immediately adjacent the valve guide is extended outwardly beyond the end area as indicated at 30 and 32 in Fig. 1 and 34 in Fig. 2 to maintain the cross-sectional area of the passage substantially constant and avoid restriction of the passage by the projection of the valve guide therein. It would obviously be quite difficult to fit a liner to this irregularly shaped passage by ordinary methods.

According to the improved process the liner is first formed as a generally cup-shaped blank having an open end portion which substantially fits the passage at the bottom of the countersink 22 and having at its closed end an extension 36 in the form of a peripheral rim which surrounds the valve guide 24 and is of sufficient depth to extend entirely across the passage around the valve guide. The general cross-sectional shape of this blank is circular and its dimensions are such that it may be passed through the end opening of the exhaust passage adjacent the countersink 22 to the position illustrated in Figs. 1 and 2 and in which its open end portion extends through the countersink 22. The blank is formed of a maleable or ductile material so that its shape may be changed by the application of pressure thereto.

After the blank 38 has been inserted in the exhaust gas passage in the position illustrated in Figs. 1 and 2 a metal block, or backing up member, 40 having a countersunk recess in one end thereof and an aperture 42 extending therethrough is placed in position such that the open end of the blank 38 is received in the countersunk recess in the end of the block and the portion 44 of the block surrounding this recess projects within the valve seat receiving recess 22 in the cylinder head. After the block 40 is placed in the position indicated, a second member 46 having a flat portion 48 and wedge shaped portion 50 and an aperture 52 extending through the web shaped portion, is placed in the position illustrated in Fig. 1 in which one surface of the wedge shaped portion bears against the end surface of the block 40 opposite the recessed end and one end of the flat portion 48 bears against the internal surface of the head at the side thereof opposite the valve guide 24. The surface of the member 46 opposite the surface contacting the block 40 is substantially flat throughout its area and when the block is in the position indicated this flat surface is substantially perpendicular to the axis 54 of the screw threads 12. A circular plate 56 having peripheral screw threads is then threaded into the open end of the cylinder head on the screw threads 12 until it forces the member 46 firmly against the block 40 and the block 40 firmly against the liner blank 38. This plate 56 has a central aperture 58 and may, if desired, be provided with a central boss 60 formed to receive a wrench for turning the plate into and out of the end of the cylinder head. A fluid conduit 62 extends from a fluid compressor, diagrammatically illustrated and indicated at 64, through the aperture 58 in the plate 56 and the aperture 52 in the member 46 and into the aperture 42 in the block 40 in which it is secured by some suitable means as, for example, by expanding the end of the conduit over the surface of the block within the recess which received the end of the blank 38.

With the various parts in the position indicated above, the pump 64 is operated to force fluid under high pressure into the interior of the blank 38. This pressure will seal the end of the blank to the block 40 and will expand the remainder of the blank until the blank conforms exactly to the shape of the portion of the exhaust passage in which it is inserted, as is indicated in Fig. 3. During this expansion of the blank the outer wall portion 66 thereof facing the end 28 of the passage will be deformed to the shape indicated by broken lines in Fig. 2 and the remainder of the extension 36 will be expanded into the enlargements 30, 32 and 34 of the passage surrounding the valve guide 24.

After the expansion of the blank 38 has been completed the members 56, 46 and 40 may be removed and the wall portion 66 of the blank and the portion 67 thereof overlying the end of the boss 24 may be machined away. After this machining operation a short, tubular liner member 68 is inserted through the opening 28 until its end contacts the machined end of the expanded blank 38, one end of this tubular member being cut on a bias as is clearly illustrated in Fig. 3. The abutting ends of the members 38 and 68 are then preferably secured together by suitable means such as welding or brazing and a complete liner for the exhaust gas passage is provided. The end of the member 38 projecting through the recess 22 may then be machined away until the member terminates flush with the bottom of the recess after which the usual exhaust valve seat insert may be positioned in the recess 22 overlying and abutting the end of the member 38. If desired the valve seat insert may be welded or brazed to the adjacent end of the member 38 to provide a continuous and unitary liner for the entire exhaust gas passage. Upon assembly of the engine the usual exhaust gas stack is screw threaded into the end 28 on the threads 70 until its end contacts the adjacent end of the liner member 68 and, with this arrangement, when the engine is operated the exhaust gases will not come in contact at any point with the material of the cylinder head but will be separated from the material of the cylinder head by the continuous liner and the exhaust stack.

While a suitable apparatus and method for accomplishing the objects set forth have been illustrated in the accompanying drawing and hereinabove described for the purpose of disclosing the invention, it is to be understood that the invention is not limited to the specific method and apparatus so illustrated and described, but that such changes in the size, shape and arrangement of the parts of the apparatus and in the steps and arrangement of steps of the method may be resorted to as come within the scope of the sub-joined claims.

Having now described the invention so that others skilled in the art may clearly understand the same, what it is desired to secure by Letters Patent is as follows:

1. The method of installing liners in valve ports in preformed engine cylinder heads in which each valve port has a cylindrical end portion connected with an intermediate portion the walls of which extend beyond the circumference of said end portion and include an inwardly projecting valve guide boss, which method comprises, forming a liner blank as a cup shaped member dimensioned to pass freely into the cylindrical end of said port and having a peripheral longitudinal extension at the closed end thereof, inserting said blank in a valve port with said extension surrounding the portion of the valve guide projecting within said port, applying fluid under pressure to the interior of said blank to expand said blank into contact with the walls of the end and intermediate portions of said port, and cutting away portions at the ends of said expanded blank including a portion extending across said port.

2. The method of lining a valve passage through an engine head having at one end a cylindrical portion connected with an irregularly shaped intermediate portion the walls of which extend beyond the circumference of said cylindrical portion and include an inwardly projecting valve guide boss having a valve guide passage therethrough comprising, forming a thin metal liner as a cup shaped blank having at the closed end thereof an extension in the form of a peripheral rim surrounding a depression the bottom of which is of substantially the same size and shape as the end of said valve guide boss, inserting said blank in said passage so that the bottom of said depression abuts the end of said boss and said rim substantially conforms to adjacent portions of said boss, temporarily sealing the open end of said blank and applying to the interior thereof fluid pressure sufficient to expand said blank into contact with the walls of said passage, and cutting away portions of said expanded blank extending across said valve passage and across said guide passage through said boss.

3. The method of lining a valve passage through an engine head having a circular opening at one end and an irregular shape of greater dimensions than said opening adjacent said opening and having a boss provided with a valve guide passage therein projecting into the irregular shaped portion of said valve passage, which comprises forming a hollow substantially cylindrical liner blank with a rim portion surrounding a re-entrant closed end, inserting said blank, closed end first, through said circular opening and locating the blank in said port so that the projecting end of said valve guide seats on the bottom of said re-entrant closed end of said blank, and said rim surrounds said valve guide, applying a backing up member to the open end of said blank to close said open end and hold said blank in position, introducing liquid under pressure through said backing up member to the interior of said blank to expand said blank into contact with the walls of the irregular shaped portion of said valve port, removing said backing up member, and cutting away the portions of said expanded blank which extend across said valve passage and across said guide passage.

4. The method of installing a liner in an engine exhaust valve passage having portions of uniform cross-section at its inner and outer ends and a portion of irregular cross-section intermediate said ends including a valve guide boss extending into the passage which consists in, forming a generally cup-shaped liner blank, inserting said blank in an exhaust valve passage with its rim disposed in said entrance portion, temporarily closing the open end of said liner blank, applying fluid pressure to the interior of said blank to expand the same into contact with the intermediate portion of said passage including the external surface of said valve guide boss and also to extrude a portion of said blank into the outlet portion of said passage, and removing the extruded material unsupported by the walls of said passage and by the external surface of said boss to restore communication through said passage.

5. The method of installing a liner in an engine exhaust valve passage having portions of uniform cross-section at its inner and outer ends and a portion of irregular cross-section intermediate said ends including a valve guide boss extending into the passage which consists in, forming a generally cup-shaped liner blank, inserting said blank in an exhaust valve passage with its rim disposed in said entrance portion, temporarily closing the open end of said liner blank, applying pressure mechanically on the rim end of the liner side wall in a direction to urge the liner side wall into the passage, applying fluid pressure to the interior of said blank to expand the same into contact with the intermediate portion of said passage including the external surface of said valve guide boss and also to extrude a portion of said blank into the outlet portion of said passage, and removing the extruded material unsupported by the walls of said passage and by the external surface of said boss to restore communication through said passage.

EARLE A. RYDER.